US011359995B2

United States Patent
Mizutani et al.

(10) Patent No.: US 11,359,995 B2
(45) Date of Patent: Jun. 14, 2022

(54) GAS SENSOR

(71) Applicant: NGK SPARK PLUG CO., LTD., Nagoya (JP)

(72) Inventors: Kensuke Mizutani, Aichi (JP); Daisuke Miyata, Nagoya (JP); Kengo Simizu, Kitanagoya (JP); Naoyuki Sugihara, Iwakura (JP); Yasuhiro Fujii, Kitanagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 378 days.

(21) Appl. No.: 16/256,051

(22) Filed: Jan. 24, 2019

(65) Prior Publication Data
US 2019/0277727 A1    Sep. 12, 2019

(30) Foreign Application Priority Data

Mar. 7, 2018    (JP) .............................. JP2018-040447

(51) Int. Cl.
*B21K 21/08* (2006.01)
*B21D 53/00* (2006.01)
(Continued)

(52) U.S. Cl.
CPC ............. *G01M 15/02* (2013.01); *B21D 53/00* (2013.01); *B21J 5/00* (2013.01); *B21K 21/08* (2013.01);
(Continued)

(58) Field of Classification Search
CPC ........ B21D 53/00; B23P 11/005; B23P 19/04; B21J 5/00; B21J 5/008; B21J 5/02; B21J 5/12; G01D 11/245
See application file for complete search history.

(56) References Cited

U.S. PATENT DOCUMENTS 7,013,696 B2 * 3/2006 Ando ...................... B21C 23/20
                                                            72/355.6
7,014,720 B2 * 3/2006 Iseda ...................... C22C 38/002
                                                            148/327
(Continued)

FOREIGN PATENT DOCUMENTS

JP    2001-249105 A    9/2001
JP    2009-2846 A      1/2009

OTHER PUBLICATIONS

Notice of Reasons for Refusal dated Aug. 2, 2021 by the Japanese Patent Office in Japanese Application No. 2018-040447.

*Primary Examiner* — Jermie E Cozart
(74) *Attorney, Agent, or Firm* — Sughrue Mion, PLLC

(57) ABSTRACT

A gas sensor (1) has a sensor element (21) extending in an axis direction and having, at a top end side thereof, a detecting portion (22) that detects gas; a stainless steel-made tubular metal shell (11) enclosing a radial direction periphery of the sensor element (21) and holding the sensor element (21) and having (a) a brim portion (14) protruding outwards in a radial direction and (b) a crimp portion (16) formed at a rear end side of the metal shell (11); and a sealing member (41) placed between the sensor element (21) and the metal shell (11). The crimp portion (16) is bent inwards in the radial direction and pressing down a rear end of the sealing member (41) toward the top end side. A Micro Vickers hardness of a cross section along the axis direction of the crimp portion (16) is 140 to 210 Hv.

1 Claim, 4 Drawing Sheets

(51) Int. Cl.
    *B21J 5/00*       (2006.01)
    *B23P 11/00*     (2006.01)
    *G01M 15/02*    (2006.01)
    *G01M 15/10*    (2006.01)
    *B23P 19/04*     (2006.01)
    *B23P 21/00*     (2006.01)
    *G01N 27/407*    (2006.01)
    *B21J 5/12*       (2006.01)
    *G01D 11/24*     (2006.01)
    *B21J 5/02*       (2006.01)

(52) U.S. Cl.
    CPC ............. *B23P 11/005* (2013.01); *B23P 19/04* (2013.01); *B23P 21/00* (2013.01); *G01M 15/104* (2013.01); *B21J 5/008* (2013.01); *B21J 5/02* (2013.01); *B21J 5/12* (2013.01); *G01D 11/245* (2013.01); *G01N 27/4077* (2013.01); *G01N 27/4078* (2013.01)

(56) References Cited

U.S. PATENT DOCUMENTS

| | | | |
|---|---|---|---|
| 9,739,748 B2* | 8/2017 | Okazaki | G01N 27/4071 |
| 2001/0004843 A1 | 6/2001 | Asai et al. | |
| 2002/0178788 A1 | 12/2002 | Asai et al. | |
| 2008/0314117 A1 | 12/2008 | Sato et al. | |
| 2012/0298648 A1* | 11/2012 | Gotou | B23K 11/0873 219/154 |
| 2013/0192988 A1* | 8/2013 | Shiono | G01N 27/4077 204/424 |
| 2013/0305809 A1* | 11/2013 | Fujita | G01D 11/245 73/31.05 |
| 2015/0052973 A1* | 2/2015 | Nakashima | G01D 11/245 73/23.2 |
| 2016/0223369 A1* | 8/2016 | Mori | G01N 27/4077 |

\* cited by examiner

GAS SENSOR

BACKGROUND OF THE INVENTION

The present invention relates to a gas sensor having a metal shell that holds a sensor element and also relates to a method of manufacturing the gas sensor.

As a related art technique of manufacturing a gas sensor, Japanese Unexamined Patent Application No. 2001-249105 (hereinafter is referred to as "JP2001-249105") discloses that the gas sensor is manufactured by assembling a sensor element to a tubular metal shell. When assembling the sensor element to the tubular metal shell, a gap between the sensor element and the metal shell is filled with a sealing member such as talc, and a ceramic sleeve is placed on a rear end of the sealing member, then a rear end of the metal shell is crimped inwards in a radial direction.

Further, by pressing down the ceramic sleeve, through a crimped portion of the metal shell, toward a top end side of the metal shell, the sealing member is compressed, thereby ensuring airtightness between the sensor element and the metal shell.

SUMMARY OF THE INVENTION

The metal shell is formed by forging a tubular material. With this forging, the metal shell can be formed without wastage of material, as compared with cutting etc.

However, when manufacturing the metal shell by forging, a residual stress occurs in the metal shell. The residual stress, especially, occurring at the crimped portion, is afterwards released when the gas sensor is exposed to high temperature, and thus there is a possibility that due to loosening of the crimped portion, sealing performance between the sensor element and the metal shell will be decreased.

The present invention was made in view of the above technical problem. An object of the present invention is therefore to provide a gas sensor and a method of manufacturing the gas sensor which are capable of suppressing the decrease in the sealing performance between the sensor element and the metal shell.

According to one aspect of the present invention, a gas sensor comprises: a sensor element extending in an axis direction and having, at a top end side thereof, a detecting portion that detects gas; a tubular metal shell enclosing a radial direction periphery of the sensor element and holding the sensor element, the metal shell made of stainless steel and having; (a) a brim portion protruding outwards in a radial direction; and (b) a crimp portion formed at a rear end side of the metal shell; and a sealing member placed between the sensor element and the metal shell, and the crimp portion being bent inwards in the radial direction and pressing down a rear end of the sealing member toward the top end side, and a Micro Vickers hardness of a cross section along the axis direction of the crimp portion being 140 to 210 Hv.

According to another aspect of the present invention, a method of manufacturing a gas sensor, the gas sensor having a sensor element extending in an axis direction and having, at a top end side thereof, a detecting portion that detects gas, a tubular metal shell enclosing a radial direction periphery of the sensor element and holding the sensor element and a sealing member placed between the sensor element and the metal shell, the method comprises: a forging process that forges columnar stainless steel material and forms a forged body that will become the metal shell later; a proto-metal shell body manufacturing process that finishes the forged body and forms a proto-metal shell body having a brim portion protruding outwards in a radial direction and a proto-crimp portion extending toward a rear end side of the proto-metal shell body; a heating process that heats the forged body or the proto-metal shell body; a sealing member disposing process that disposes the sealing member between the sensor element and the proto-metal shell body having undergone the heating process; and an assembling process that bents the proto-crimp portion inwards in the radial direction and forms a crimp portion, and presses down a rear end of the sealing member toward the top end side and assembles the sensor element to the metal shell.

According to the present invention, it is possible to suppress the decrease in the sealing performance between the sensor element and the metal shell.

The other objects and features of this invention will become understood from the following description with reference to the accompanying drawings.

DETAILED DESCRIPTION OF THE INVENTION

Figure 1:
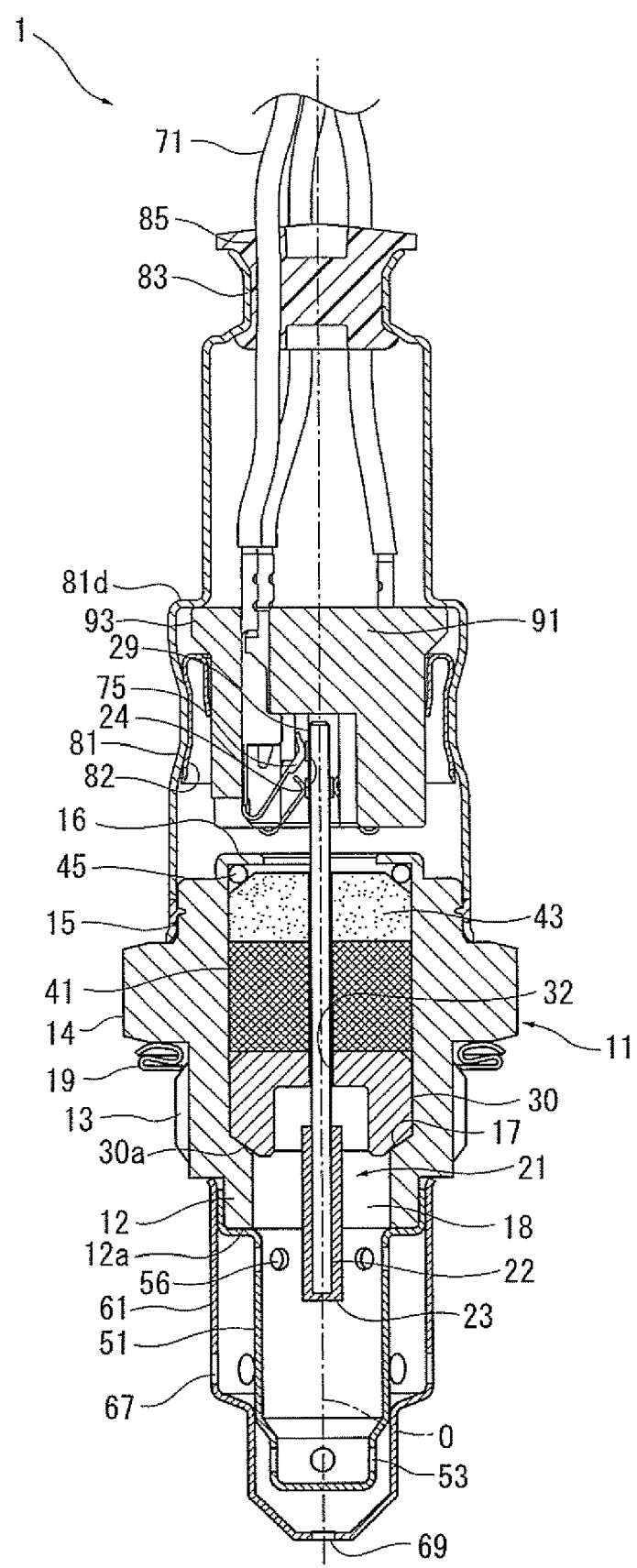
FIG. 1 is a sectional view of a gas sensor according to an embodiment of the present invention.

A gas sensor according to an embodiment of the present invention will be explained below with reference to FIG. 1. FIG. 1 is a sectional view of the gas sensor 1 according to the embodiment of the present invention.

As shown in FIG. 1, the gas sensor (a wide range air-fuel ratio gas sensor) 1 has a sensor element 21, a holder (a ceramic holder) 30 having a penetration hole 32 into which the sensor element 21 is inserted in an axis O direction and a metal shell 11 enclosing a radial direction periphery of the ceramic holder 30.

A top end side portion of the sensor element 21, where a detecting portion 22 is formed, protrudes from the ceramic holder 30 toward a top end. The sensor element 21 inserted into the penetration hole 32 in this manner is secured inside the metal shell 11 with airtightness ensured in top and rear directions by compressing a sealing member (in the present embodiment, talc) 41 placed at a rear end surface side (an upper side in FIG. 1) of the ceramic holder 30 in the top and rear directions through a sleeve 43 made of insulating material and a ring washer 45.

Here, a portion of a rear end 29 side, including the rear end 29, of the sensor element 21 protrudes from the sleeve 43 and the metal shell 11 toward the rear side. And, terminal metals 75 provided at top ends of respective lead wires 71 drawn out to the outside through an elastic member 85 are press-fitted to electrode terminals 24 formed at the rear end 29 side portion, thereby establishing electrical connection between them. The rear end 29 side portion, including these electrode terminals 24, of the sensor element 21 is covered with an outer cylinder 81. Details will be further explained below.

The sensor element 21 extends in the axis O direction, and has a batten plate shape (a plate shape) having, at a top end side (a lower side in FIG. 1) of the sensor element 21 which is directed toward a measuring object, the detecting portion 22 formed by detection electrodes etc. (not shown) and detecting a specific gas component in measured gas. The sensor element 21 is rectangular in cross-section, and its shape is the same (i.e. a constant-sized rectangular) throughout the top and rear directions. This long narrow sensor element 21 is mainly made of ceramic (a solid electrolyte etc.). The sensor element 21 itself is the same as a well-known sensor element. A pair of detection electrodes that form the detecting portion 22 are arranged at a top end side portion of the solid electrolyte (a solid electrolyte member), whereas at the rear end side portion, the electrode terminals 24 to which the lead wires 71 for outputting detection is electrically connected are provided so as to be exposed at the rear end side portion.

Further, in the present embodiment, a heater (not shown) is provided at an inside of the top end side portion of the ceramic member laminated at the solid electrolyte (the solid electrolyte member) of the sensor element 21, and the electrode terminal 24 to which the lead wire 71 for applying voltage to this heater is connected is provided so as to be exposed at the rear end side portion. Here, these electrode terminals 24 are shaped into a rectangle extending in a longitudinal direction, although these are not shown. For instance, two or three electrode terminals are arranged in a lateral direction on a batten plate-shaped wide surface (on both surfaces) at the rear end 29 side portion of the sensor element 21.

The detecting portion 22 of the sensor element 21 is covered with a porous protection layer 23 made of alumina or alumina.

The metal shell 11 is formed of a tubular or cylindrical stainless steel whose diameter is concentrically changed in the top and rear directions. The metal shell 11 has, at the top end side thereof, a small diameter cylindrical ring-shaped portion (hereinafter, also called a cylinder portion) 12 onto which after-mentioned protectors 51 and 61 are fixedly fitted. The metal shell 11 also has, on an outer peripheral surface at a rear side (an upper side in FIG. 1) with respect to the ring-shaped portion 12, a screw portion 13 having a larger diameter than that of the ring-shaped portion 12 for fixing to an exhaust pipe of an engine. In addition, the metal shell 11 has, at a rear side with respect to the screw portion 13, a polygonal brim portion 14 formed so as to protrude outwards in a radial direction in order for the gas sensor 1 to be screwed into the engine exhaust pipe through the screw portion 13.

Further, at a rear side with respect to this brim portion 14, a cylindrical portion 15 onto which a protection cylinder (the outer cylinder) 81 covering the rear side of the gas sensor 1 is fitted and welded is provided. At a rear side with respect to the cylindrical portion 15, a thinner crimp portion (a bending portion) 16 whose outside diameter is smaller than that of the cylindrical portion 15 is provided. Here, in FIG. 1, this crimp portion 16 is bent inwards because FIG. 1 shows a state in which the crimp portion 16 is crimped. Furthermore, a gasket 19 serving as a seal when screwed is secured on a lower surface of the brim portion 14.

The metal shell 11 is provided with an inner hole 18 that penetrates the metal shell 11 in the axis O direction. The inner hole 18 has, at an inner peripheral side thereof, a stepped portion (an inclined portion) 17 that is tapered inwards in the radial direction from the rear end side toward the top end side.

As the stainless steel forming the metal shell 11, SUS430 etc. are used.

The ceramic holder 30 formed of insulation ceramic (e.g. alumina) and shaped into a substantially short cylinder is disposed inside the metal shell 11. The ceramic holder 30 has a top end-facing surface 30a that is formed into a tapered shape toward the top end. Positioning of the ceramic holder 30 is made inside the metal shell 11 by being pressed down by the sealing member 41 from the rear end side with an outer peripheral side portion of the top end-facing surface 30a being in contact with the stepped portion 17, and also a gap between the ceramic holder 30 and the metal shell 11 disappears.

On the other hand, the penetration hole 32 is provided at a center of the ceramic holder 30. And, an opening of the penetration hole 32 is rectangular in shape which is the substantially same-sized shape as a cross section of the sensor element 21 so that the sensor element 21 is inserted into the penetration hole 32 without a gap.

A gap between an outer surface of the sensor element 21 at the rear end side of the ceramic holder 30 and an inner surface of the metal shell 11 is filled with the sealing member 41. Further, the sleeve 43 is placed at a rear end of a compressed powder 37.

Then, the crimp portion 16 of the metal shell 11 is crimped so as to be bent inwards in the radial direction, and the crimp portion 16 presses down the sealing member 41 toward the top end side through the ring washer 45 and the sleeve 43. With this, the sealing member 41 is compressed between the sleeve 43 and the ceramic holder 30, and fills the gap between the sensor element 21 and the metal shell 11. Seal between the sensor element 21 and the metal shell 11 and fixation of the sensor element 21 inside the metal shell 11 are made in this manner.

The sensor element 21 is inserted into the penetration hole 32 of the ceramic holder 30, and the top end of the sensor element 21 protrudes from the ceramic holder 30 and further protrudes from a top end 12a of the metal shell 11 toward the top end.

In the present embodiment, the top end portion of the sensor element 21 is covered with closed-bottomed cylindrical-shaped protectors (protection covers) 51 and 61 forming a double protection structure and having air vents (air holes) 56 and 67. As mentioned above, a rear end of the protector 51 located at an inner side is fitted onto the cylinder portion 12 of the metal shell 11, and welded to the cylinder portion 12 of the metal shell 11. The air vents 56 are provided, for instance, at eight positions at the rear end side of the protector 51 in a circumferential direction of the protector 51. On the other hand, at a top end side of the protector 51, for instance, expelling holes 53 are provided at four positions in the circumferential direction of the protector 51.

The protector 61 located at an outer side is fitted onto the protector 51 located at the inner side, and welded to the cylinder portion 12 (to the protector 51) all at once. The air vents 67 of the protector 61 are provided, for instance, at eight positions at a top end side portion of the protector 61 in a circumferential direction of the protector 61. An expelling hole 69 is provided at a bottom center of a top end of the protector 61.

Further, as shown in FIG. 1, the terminal metals 75 provided at the top ends of the respective lead wires 71 drawn out to the outside through the elastic member 85 are press-fitted to the electrode terminals 24 formed at the rear end 29 side portion of the sensor element 21 by a spring function of each terminal metal 75, thereby establishing electrical connection between them. The terminal metals 75 including these press-fitting portions are arranged so as to face to each other in accommodation parts formed in an insulation separator 91 provided inside the outer cylinder 81 of the gas sensor 1. Here, movement to the radial direction and to the top end side of the separator 91 is restrained through a holding member 82 that is fixed inside the outer cylinder 81 by squeezing etc. By fitting a top end portion of this outer cylinder 81 onto the cylindrical portion 15 located at the rear end side of the metal shell 11 and welding the top end portion of this outer cylinder 81 to the cylindrical portion 15, a rear side of the gas sensor 1 is hermetically covered.

As mentioned above, the lead wires 71 are drawn out to the outside through the elastic member (e.g. rubber) 85 provided at an inner side of a rear end portion (a small diameter cylindrical portion 83) of the outer cylinder 81. By squeezing the small diameter cylindrical portion 83 and compressing the elastic member 85, airtightness of this portion is maintained.

At a rear end side with respect to the middle in the axis O direction of the outer cylinder 81, a stepped portion 81$d$ having a large diameter at a top end side thereof is formed, and an inner surface of this stepped portion 81$d$ supports the separator 91 so as to press a rear end of the separator 91 to the top side. Further, the separator 91 is provided, at an outer periphery thereof, with a flange 93, and held by the stepped portion 81$d$ and the holding member 82 in the axis O direction with the flange 93 supported on the holding member 82 fixed inside the outer cylinder 81.

Here, it is noted that the present invention is based on the premise that the metal shell 11 is manufactured by forging, and the present invention does not include a case where the metal shell 11 is manufactured only by cutting without forging. Also in the case where the metal shell 11 is manufactured only by cutting without forging, a Micro Vickers hardness of a cross section of the crimp portion 16 could be 140 to 210 Hv. However, since the metal shell 11 is not manufactured by forging, a residual stress is small, and thus a problem of loosening the crimp portion 16 by the fact that the gas sensor is exposed to high temperature does not arise from this case. Therefore, the present invention is not applied to this case.

A fact that the metal shell 11 is manufactured by forging can be judged by a tool mark formed at the middle of the inner hole 18 of the metal shell 11, or judged according to whether there is a mark or trace of an after-mentioned punching around the top end of the inner hole 18 of the metal shell 11.

Next, a method of manufacturing the gas sensor 1 according to the embodiment of the present invention will be explained with reference to FIGS. 2A to 2E to FIG. 4.

Figure 2A:
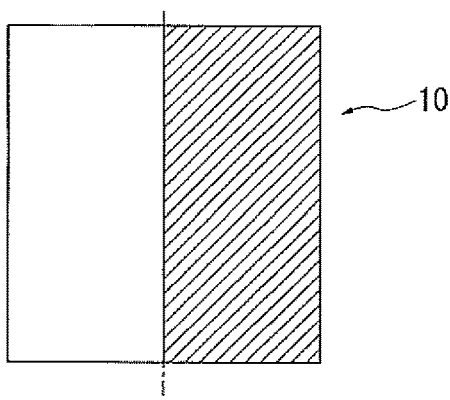
FIGS. 2A to 2E are drawings showing manufacturing processes of the gas sensor according to the embodiment of the present invention.
Figure 2C:
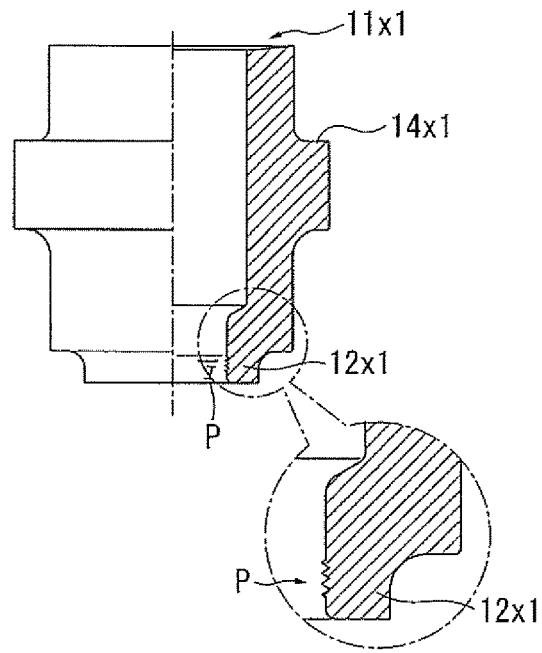
Figure 2B:
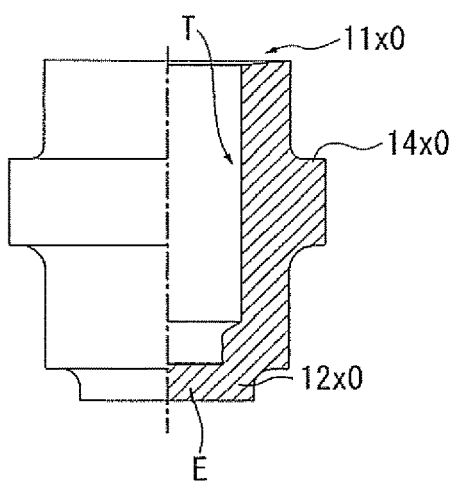
Figure 2D:
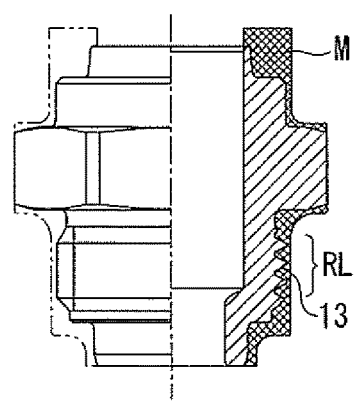
Figure 2E:
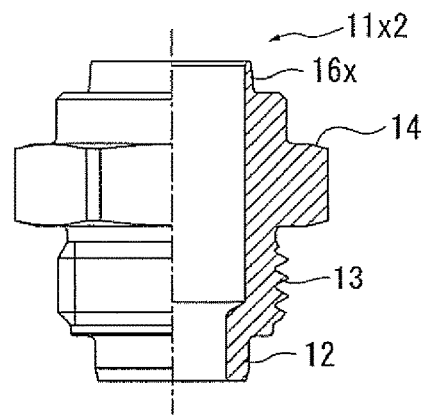
Figure 3:
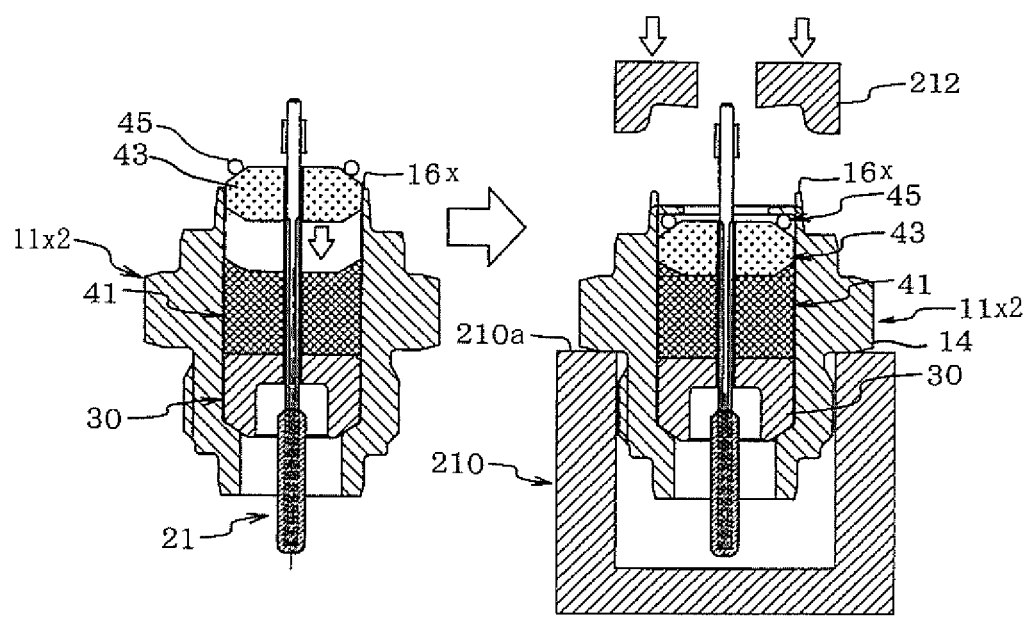
FIG. 3 is a drawing showing processes subsequent to FIGS. 2A to 2E.
Figure 4:
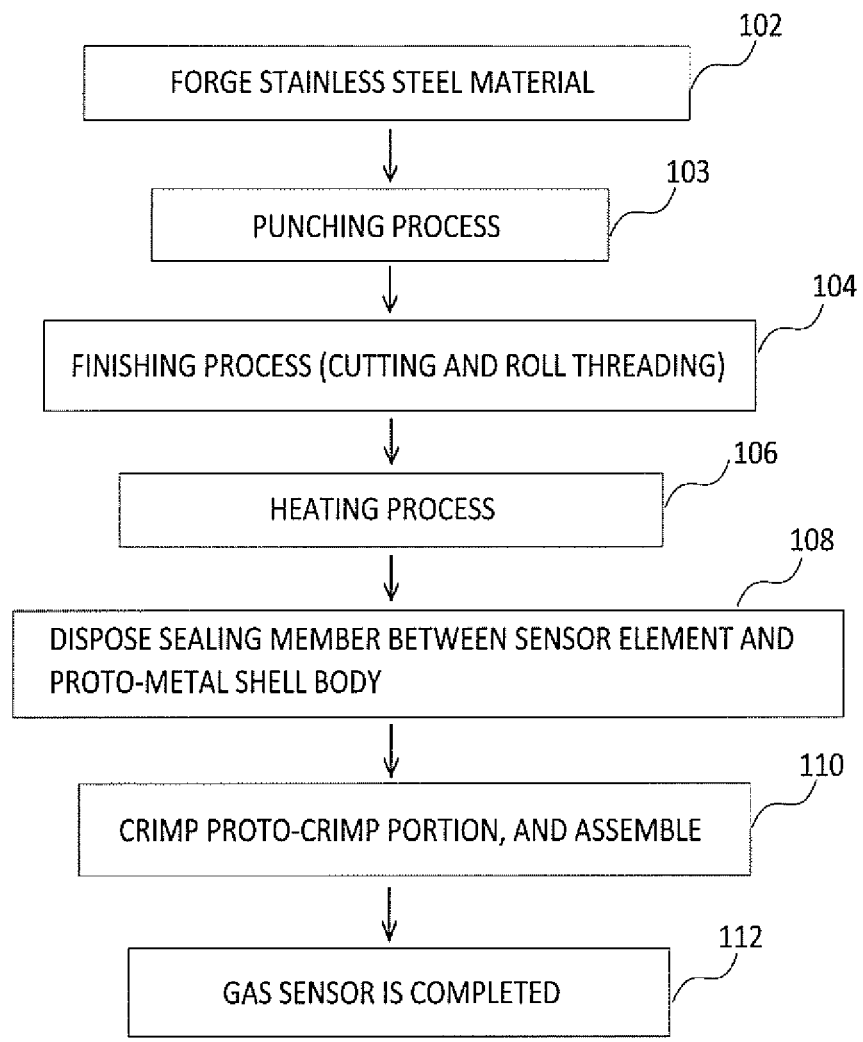
FIG. 4 is a flow chart showing the manufacturing processes of the gas sensor according to the embodiment of the present invention.

FIGS. 2A to 2E and FIG. 3 are drawings showing manufacturing processes of the gas sensor 1 according to the embodiment of the present invention. FIG. 4 is a flow chart showing the manufacturing processes of the gas sensor 1.

First, as shown in FIGS. 2A to 2E, a columnar stainless steel material 10 is prepared (FIG. 2A), and by forging the stainless steel material 10, a forged body 11$x$0 is obtained (FIG. 2B, a step 102 in FIG. 4). This forged body 11$x$0 has at least a proto-brim portion 14$x$0 that will become the brim portion 14 later, and also has, at a portion close to a top end of the forged body 11$x$0, a proto-ring-shaped portion 12$x$0 that will become the ring-shaped portion 12 later.

A tool mark T indicating that a plurality of times of punching process are performed is formed around the middle in an axis direction on an inner peripheral surface of the forged body 11$x$0. Further, an inner surface at the top end side of the forged body 11$x$0 is not opened, but an excess material E, like a lid, extending in a radial direction is formed at the top end side of the forged body 11$x$0.

Next, the excess material E is punched by performing the punching process to the inner surface of the forged body 11$x$0, and a punched body 11$x$1 is obtained (a punching process; FIG. 2C, a step 103 in FIG. 4). Here, a proto-ring-shaped portion 12$x$1 and a proto-brim portion 14$x$1 are the substantially same as the proto-ring-shaped portion 12$x$0 and the proto-brim portion 14$x$0 respectively. Further, on an inner peripheral surface of the proto-ring-shaped portion 12$x$1, a mark or trace P of the punching, indicating continuation of a cutting surface and a broken-out surface, is formed.

Subsequently, as a finishing process, an outer surface of the punched body 11$x$1 undergoes a cutting process M, and a portion that will become the screw portion 13 later undergoes a roll threading process RL, then a proto-metal shell body 11$x$2 is obtained (a proto-metal shell body manufacturing process; FIGS. 2D and 2E, a step 104 in FIG. 4). This proto-metal shell body 11$x$2 has at least a brim portion 14 having the same shape as that of the metal shell 11, and also has a ring-shaped portion 12 and a screw portion 13 having the same shapes as those of the metal shell 11. However, a proto-crimp portion 16$x$ is not crimped yet, but extends in the axis O direction, and thus has a tubular shape as shown in FIG. 2E. This point is different from the crimp portion 16 of the metal shell 11 after assembly to the gas sensor 1.

Next, the proto-metal shell body 11$x$2 undergoes a heating process (a heating process; a step 106 in FIG. 4). As a condition of the heating process, it is determined such that a Micro Vickers hardness of a cross section along the axis O direction of the crimp portion 16 is 140 to 210 Hv. If the crimp portion (the proto-crimp portion 16$x$) does not undergo the heating process, since a strength of the crimp portion after forging is high, when exposed to high temperature upon use of the gas sensor 1, there is a possibility that the crimp portion 16 will loosen and sealing performance between the sensor element 21 and the metal shell 11 will be decreased. On the other hand, if the crimp portion (the proto-crimp portion 16$x$) is subjected to overheating, the crimp portion softens and a hardness of the crimp portion is too low.

In the case where the metal shell 11 is manufactured by forging, if the heating process is not carried out, the residual stress remains at the crimp portion. Then, when the gas sensor 1 is exposed to high temperature afterwards, the residual stress is released, and consequently the crimp portion loosens.

Therefore, the crimp portion (the proto-crimp portion 16$x$) of the metal shell 11 (the proto-metal shell body 11$x$2) manufactured by forging undergoes the heating process previously before the crimp portion is crimped, and the residual stress is released. By crimping the crimp portion (the proto-crimp portion 16$x$) after releasing the residual stress, even if the gas sensor 1 (the crimp portion 16) is exposed to high temperature, the decrease in the sealing performance of the sealing member between the sensor element 21 and the metal shell 11, which is caused by the fact that the crimp portion 16 loosens, can be suppressed.

The heating process can be performed at any time after the forging process is performed. Here, although the finishing process might be performed after the forged body 11$x$0 undergoes the heating process, if the material softens when performing the finishing process, there is a possibility that the cutting and the thread rolling will be difficult. Therefore, it is desirable that the heating process be performed to the proto-metal shell body 11x2 having undergone the finishing process.

Subsequently, the ceramic holder 30, the sealing member 41 and the sleeve 43 are disposed between the sensor element 21 and the proto-metal shell body 11x2 having undergone the heating process from the top end side, and the ring washer 45 is placed at a rear end of the sleeve 43 (a sealing member disposing process; FIG. 3, a step 108 in FIG. 4).

Thereafter, by bending the proto-crimp portion 16x inwards in the radial direction, the crimp portion 16 (see FIG. 1) is formed. And, by pressing down a rear end of the sealing member 41 toward the top end side through the sleeve 43, the sensor element 21 is assembled to the metal shell 11 (an assembling process; FIG. 3, a step 110 in FIG. 4).

More specifically, when performing the assembling process, the sealing member 41 is disposed between the sensor element 21 and the proto-metal shell body 11x2 having undergone the heating process, and the sealing member 41 is previously compressed. Then, the ring washer 45 is placed at the rear end of the sleeve 43. In this state, the proto-metal shell body 11x2 holding the sensor element 21 is supported and secured by an installation jig 210. When supporting the proto-metal shell body 11x2 holding the sensor element 21, a lower surface of the brim portion 14 of the metal shell 11 contacts a positioning portion 210a that is an upper surface of the installation jig 210. Then, by compressing the proto-crimp portion 16x to the top end side by a crimping die 212, the proto-crimp portion 16x is bent inwards. With this, the sealing member 41 is further compressed, and parts including the sensor element 21 and the sleeve 43 etc. are fixed inside the metal shell 11.

Finally, an assembly in which the elastic member 85, the terminal metals 75, the lead wires 71, the insulation separator 91 and the holding member 82 are accommodated in the outer cylinder 81 is fitted onto the cylindrical portion 15 located at the rear end side of the metal shell 11, and the holding member 82 is squeezed together with the outer cylinder 81, although these processes are not shown.

Then, by performing laser-welding to the top end portion of the outer cylinder 81 throughout the entire circumference of the outer peripheral surface of the metal shell 11, the outer cylinder 81 is fixed to the metal shell 11. Further, the elastic member 85 is squeezed after being assembled to the rear end of the outer cylinder 81.

The gas sensor 1 of the present embodiment is completed in this manner (a step 112 in FIG. 4).

The gas sensor of the present invention includes all design modifications and equivalents belonging to the technical scope of the present invention.

As the sensor element, it is not limited to a sensor that measures a concentration of oxygen, but a sensor that measures a concentration of nitrogen oxides (NOx) or hydrocarbon (HC) can be used. A shape of the sensor element could be a tubular or cylindrical shape.

The finishing process in the proto-metal shell body manufacturing process is not limited to the cutting process and the roll threading process. A process that shapes the proto-metal shell body into an outside shape of the metal shell 11 can be employed as the finishing process.

The sealing member is not limited to the talc, but a member that is deformed by being pressed down by the crimp portion then has a sealing function could be used.

EXPLANATION OF REFERENCE

1 . . . gas sensor
11 . . . metal shell
11x0 . . . forged body
11x2 . . . proto-metal shell body
14 . . . brim portion
14L . . . grain flow (fiber flow)
16 . . . crimp portion
16x . . . proto-crimp portion
21 . . . sensor element
22 . . . detecting portion
41 . . . sealing member
O . . . axis The entire contents of Japanese Patent Applications No. 2018-040447 filed on Mar. 7, 2018 is incorporated herein by reference.

Although the invention has been described above by reference to certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A method of manufacturing a gas sensor, the gas sensor having a sensor element extending in an axis direction and having, at a top end side thereof, a detecting portion that detects gas, a tubular metal shell enclosing a radial direction periphery of the sensor element and holding the sensor element and a sealing member placed between the sensor element and the metal shell, the method comprising:
 a forging process that forges columnar stainless steel material and forms a forged body that will become the metal shell later;
 a proto-metal shell body manufacturing process that finishes the forged body and forms a proto-metal shell body having a brim portion protruding outwards in a radial direction and a proto-crimp portion extending toward a rear end side of the proto-metal shell body;
 a heating process that heats the forged body or the proto-metal shell body so as to release residual stress imparted to the proto-crimp portion that is formed from the forged body;
 a sealing member disposing process that disposes the sealing member between the sensor element and the proto-metal shell body having undergone the heating process; and
 an assembling process that bends the proto-crimp portion inwards in the radial direction and forms a crimp portion, and presses down a rear end of the sealing member toward the top end side and assembles the sensor element to the metal shell.

* * * * *